US007044327B2

(12) United States Patent
Vaitses

(10) Patent No.: US 7,044,327 B2
(45) Date of Patent: May 16, 2006

(54) SYSTEM AND METHOD FOR TANK PRESSURE COMPENSATION

(76) Inventor: Stephen P. Vaitses, 119 Grove St., Clinton, CT (US) 06413

( * ) Notice: Subject to any disclaimer, the term of this patent is extended or adjusted under 35 U.S.C. 154(b) by 0 days.

(21) Appl. No.: 10/871,162

(22) Filed: Jun. 17, 2004

(65) Prior Publication Data

US 2005/0199294 A1 Sep. 15, 2005

Related U.S. Application Data

(60) Provisional application No. 60/553,039, filed on Mar. 12, 2004.

(51) Int. Cl.
*B65D 90/28* (2006.01)
*F16K 24/04* (2006.01)

(52) U.S. Cl. ....................................... 220/748; 137/587

(58) Field of Classification Search ................ 137/587; 220/747, 748, 749, 750
See application file for complete search history.

(56) References Cited

U.S. PATENT DOCUMENTS

| | | | | | |
|---|---|---|---|---|---|
| 1,506,610 | A | * | 8/1924 | Booth | 220/228 |
| 1,563,199 | A | * | 11/1925 | LeLand | 220/747 |
| 1,709,257 | A | * | 4/1929 | Fleming | 220/747 |
| 1,988,325 | A | * | 1/1935 | Mobley | 220/203.03 |
| 2,061,175 | A | * | 11/1936 | Staber | 220/748 |
| 2,117,829 | A | * | 5/1938 | Staber | 220/748 |
| 2,247,566 | A | * | 7/1941 | Walton | 137/254 |
| 2,552,472 | A | * | 5/1951 | Whidden | 220/88.3 |
| 3,124,937 | A | * | 3/1964 | King | 62/47.1 |
| 4,552,175 | A | | 11/1985 | Schiemann | 137/571 |
| 4,854,469 | A | * | 8/1989 | Hargest | 220/374 |
| 5,019,141 | A | | 5/1991 | Granville et al. | 55/170 |
| 5,229,766 | A | | 7/1993 | Hargest | 340/984 |
| 5,322,099 | A | | 6/1994 | Langlois | 141/307 |
| 5,501,255 | A | | 3/1996 | Tortu et al. | 141/95 |
| 5,515,891 | A | | 5/1996 | Langlois | 141/307 |
| 5,570,730 | A | | 11/1996 | Keehn, Jr. et al. | 141/59 |
| 5,590,697 | A | | 1/1997 | Benjey et al. | 141/59 |
| 5,662,149 | A | | 9/1997 | Armellino | 141/86 |
| 5,727,603 | A | | 3/1998 | Langlois | 141/1 |
| 5,878,795 | A | | 3/1999 | Armellino | 141/86 |
| 5,894,809 | A | | 4/1999 | Grigaitis et al. | 114/343 |
| 5,950,688 | A | | 9/1999 | Langlois | 141/1 |
| 5,975,154 | A | | 11/1999 | Bennett | 141/59 |
| 6,152,196 | A | | 11/2000 | Kehoe | 141/198 |
| 6,237,645 | B1 | | 5/2001 | Pountney | 141/7 |

OTHER PUBLICATIONS

PCT Search Report for PCT/US2005/005376.

* cited by examiner

*Primary Examiner*—John Rivell
(74) *Attorney, Agent, or Firm*—Cantor Colburn LLP

(57) ABSTRACT

A supplemental fluid tank, preferably having two chambers each partially containing a fluid, fluid communicated intermediate a fuel tank and vent to reduce fuel vapor emissions, particularly for a boat. More specifically, when fuel is used or cooled, pressure or volume, respectively, of the remaining fuel in the fuel tank is reduced in prior art systems. Accordingly, air is drawn into the fuel tank through the vent line and becomes saturated with fuel (i.e., fuel vapor). Conversely, when fuel in the fuel tank is warmed it expands and fuel vapor is forced out of the vent into the environment. An exemplary embodiment reduces entry of air in through the vent and escape of fuel vapor out of the vent using two intermediate chambers in fluid communication with each other, each preferably having a non-evaporative fluid (e.g., oil), to provide volume/pressure compensation of the fuel in the fuel tank.

20 Claims, 9 Drawing Sheets

SYSTEM AND METHOD FOR TANK PRESSURE COMPENSATION

CROSS REFERENCE TO RELATED APPLICATION

This application claims the benefit of U.S. Provisional Application No. 60/553,039, filed Mar. 12, 2004 the contents of which are incorporated by reference herein in their entirety.

BACKGROUND OF THE INVENTION

This invention relates generally to a system and method for tank pressure compensation and specifically to a system and method for fuel tank pressure compensation for an internal combustion engine and, more particularly, this invention relates to a barrier tank assembly utilized to reduce diurnal emissions from a fuel tank, particularly in a marine vessel.

Vehicles powered by internal combustion engines have at least one fuel tank that generally holds a supply of liquid fuel for the engine. The tanks are typically connected to a filler tube that is used to introduce fuel into the tank. The outer opening of the filler tube is usually covered with a removable cap.

When fuel is added to the tank, it displaces the air in the tank. The air, which is laden with fuel vapor, rushes out of the tank as the fuel enters. In many situations, foam is created by agitation of the fuel entering the tank. In some vehicles, the displaced air and foam rushes back to the filler tube as the tank is filled and splashes out on the person filling the tank. Other fuel systems include a vent line that extends from the interior of the tank to the atmosphere. The vent line enables air to escape from the tank as it is filled with fuel through the filler tube. The vent line also enables air to enter the tank as fuel is withdrawn for delivery to the engine.

The fuel tank vent line also serves to prevent pressure from building in the tank. If the tank were un-vented, increasing temperature of the fuel would cause fuel and vapor expansion that would cause the pressure in the tank to rise. If the pressure became too high, the fuel tank could rupture, causing fire or explosion.

Fuel systems used on marine crafts usually include a vent line from the fuel tank. The vent line typically opens to the atmosphere over the water. As the fuel tank is filled to near the top, the air flowing out of the vent line can carry fuel and foam overboard on to the water. Wave action that rocks a boat can also cause fuel to be discharged overboard both during fueling and when the tank is full. In addition, thermal expansion of the fuel due to an increase in fuel temperature may also cause either or both fuel and fuel vapor to be discharged overboard when the tank is full.

Thermal expansion refers to the expansion of fuel when it is heated to a higher temperature. Both gasoline and diesel fuel expand when their temperature rises. For example, fifty gallons of gasoline will expand by approximately 1.61 gallons when the temperature of the gasoline increases by thirty-four degrees Celsius. Similarly, two hundred gallons of gasoline will expand by approximately 6.46 gallons when the temperature of the gasoline is raised by thirty-four degrees Celsius. Diesel fuel expands at a lower rate than gasoline. For example, fifty gallons of diesel fuel will expand by approximately 1.36 gallons and two hundred gallons of diesel fuel will expand by approximately 5.44 gallons when the temperature of the diesel fuel is raised by thirty-four degrees Celsius. Thermal expansion can cause fuel to expand and fuel vapor to be forcibly discharged overboard via the vent line when the fuel tank does not have the space to accommodate the excess fuel and fuel vapor. Fuel and vapor discharged overboard poses a pollution hazard and is harmful to wildlife. There is also a risk that fuel floating on the water or emitted fuel vapor may catch fire causing injury to life or property. Furthermore, when fuel in the fuel tank is consumed and/or cooled, the volume is reduced. Air is drawn into the fuel tank through the vent line and becomes saturated with fuel vapor. Conversely, when this fuel in the tank is then warmed or is filled with additional fuel, the fuel expands and fuel vapor is forced out the vent line.

Accordingly, what is needed is a system and method to allow for some expansion and contraction without inducing air into the fuel tank or fuel vapor to the atmosphere.

BRIEF SUMMARY OF THE INVENTION

The above drawbacks and deficiencies are overcome or alleviated by A tank pressure compensation system including a chamber having a first end and a second end, the first end connectable to a fluid repository having a first fluid for fluid communication with the first end and the second end in fluid communication with the atmosphere. The chamber is receptive to a second fluid contained in a portion of the chamber intermediate the first and second ends disposed above a level of the second fluid, wherein the chamber allows displacement of the second fluid away from the first end toward the second end of the chamber when the first fluid expands while preventing flow of the first fluid into the atmosphere.

In one exemplary embodiment, a marine vessel fuel tank pressure compensation assembly for use in the hull of a marine vessel that has a fuel system including a fuel tank vented to a vent that communicates with the atmosphere is disclosed. The system includes a first chamber having a first lower portion and a first upper portion, the first upper portion configured for fluid communication with a first fluid disposed in the fuel tank via a fuel vent line; a second chamber having a second lower portion and a second upper portion, the second upper portion configured for fluid communication with the vent via a vent line, the second lower portion in fluid communication with the first lower portion of the first chamber; a barrier fluid disposed in at least a portion of the first chamber, the barrier fluid configured to allow displacement of the barrier fluid from the first chamber into the chamber when the first fluid expands while preventing flow of the first fluid into the atmosphere.

In another exemplary embodiment, a method of reducing fuel vapor emitted from a vent line utilizing a pressure compensation assembly in the hull of a marine vessel that has a fuel system including a fuel tank connected to a vent via the vent line that communicates with the atmosphere, wherein the vent line includes a first vent line fitting and a second vent line fitting both adapted for direct parallel communication with the pressure compensation assembly is disclosed. The method includes attaching the pressure compensation assembly to the marine vessel, wherein the pressure compensation assembly includes: a first chamber having a first lower portion and a first upper portion, the first upper portion configured for fluid communication with a first fluid disposed in the fuel tank via a fuel vent line; a second chamber having a second lower portion and a second upper portion, the second upper portion configured for fluid communication with the vent via a vent line, the second lower portion in fluid communication with the first lower portion of the first chamber; a barrier fluid disposed in at least a portion of the first chamber, the barrier fluid configured to allow displacement of the barrier fluid from the first chamber into the chamber when the first fluid expands while preventing flow of the first fluid into the atmosphere.

BRIEF DESCRIPTION OF THE DRAWINGS

Referring to the exemplary drawings wherein like elements are numbered alike in the several FIGURES.

DETAILED DESCRIPTION OF THE INVENTION

Intent of the invention is to limit flow of a fluid from a tank into the atmosphere, and more particularly, limiting hydrocarbon emissions from fuel tanks. Temperature changes of fuel and fuel vapor cause a change in volume. Heating causes expansion of the fuel and fuel vapor resulting in the expulsion of fuel vapor from the fuel tank. Cooling of the fuel and fuel vapor causes a contraction of fuel and fuel vapor resulting in the induction of air into the tank. Air induction into the fuel tank creates additional fuel vapor.

Daily cycles of temperature change are referred to as diurnal cycles. The invention creates a barrier between the fuel vapor in the fuel tank and the atmosphere. Two tanks, or a single compartmented tank are filled to a little less than about ½ capacity with a fluid, such as oil. The oil can move between the two chambers allowing for volume changes in the fuel tank while preventing outside air and fuel tank vapors from mixing.

By displacing the fluid from one compartment to the other and back, small volumetric changes caused by temperature or atmospheric pressure can be compensated for while maintaining a barrier between fuel tank vapor and outside air.

Figure 1:
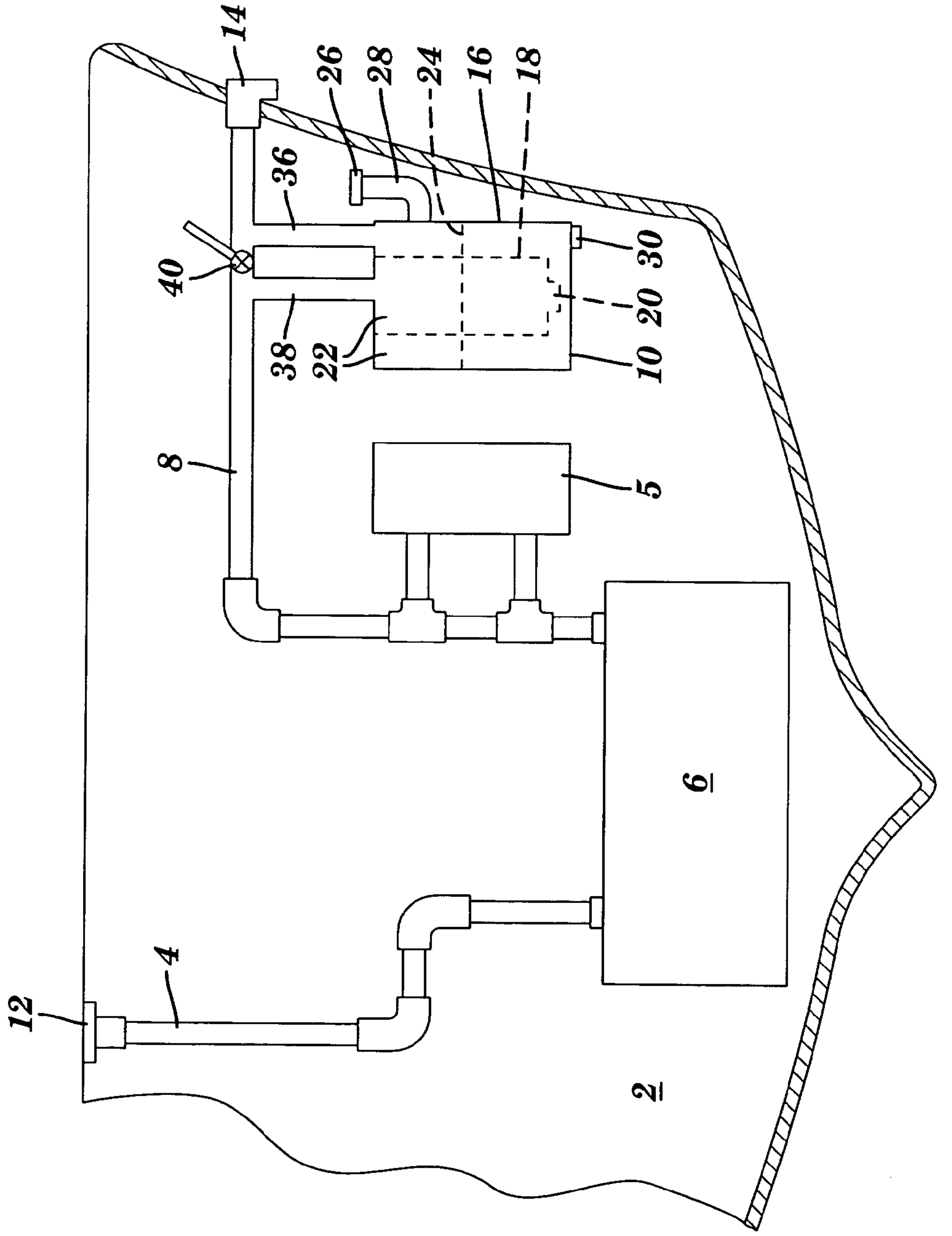
FIG. 1 is a diagrammatic view of a portion of a hull in a marine vessel, partially cut away to show an arrangement of a fuel expansion tank, a fuel tank, a pressure compensation tank assembly, a fuel filler tube and a fuel vent line in accordance with an exemplary embodiment of the present invention.

FIG. 1 is a diagrammatic view of a portion of a hull 2 on a marine vessel, partially cut away to show a tank vent system arrangement of a fuel expansion tank 5, a fuel tank 6, a fuel filler tube 4, a fuel vent line 8, and a pressure compensation tank 10 in accordance with an exemplary embodiment of the present invention. The fuel tank 6 supplies fuel to an inboard engine, not shown. A typical fuel tank 6 has a fitting thereon that receives the fuel filler tube 4 and the fuel filler tube 4 extends to a fuel deck type fuel fitting 12 mounted to the gunwale of the boat hull 2. Another fitting on the fuel tank 6 receives the fuel vent line 8. The fuel vent line 8 leads from the fuel tank 6 to a vent 14 that extends through the hull 2 of the marine vessel and vents the interior of the fuel tank 6 to the ambient atmosphere. The vent 14 may be located anywhere in the hull 2 of the marine vessel dependent on the choice of the boat designer and/or manufacturer.

The fuel expansion tank 5 is optionally attached to the fuel vent line 8 in accordance with copending U.S. patent application Ser. No. 10/460,243, entitled, "MARINE VESSEL FUEL OVERFLOW TANK SYSTEM," filed on Jun. 11, 2003, the contents of which are incorporated herein in their entirety. The fuel expansion tank 5 is mounted above the fuel tank 6 to allow fuel collected in therein to drain back into the fuel tank 6 when the fuel tank 6 has excess capacity.

The pressure compensation tank 10 is disposed in fluid communication with and intermediate the vent 14 and fuel tank 6. Pressure compensation tank 10 includes a first chamber 16 in fluid communication with a second chamber 18 (shown in phantom) disposed in the first chamber 16. First chamber 16 in fluid communication with second chamber 18 via an opening 20 disposed at a bottom surface defining second chamber 18. First and second chambers are filled with a barrier fluid, such as oil 22, but not limited thereto, indicated below a dashed line 24. Chambers 16 and 18 are filled with oil 22 by removing a cap 26 from a filler tube 28 extending first chamber 16. Fluid 22, such as oil, for example, may be drained from chambers 16 and 18 via an outlet 30 extending from first chamber 16. In one embodiment, outlet 30 may be used to draw oil 22 therefrom for injecting oil 22 directly into the engine rather than premixing the oil 22 in the fuel for combustion in a two-stroke engine.

First chamber 16 is in fluid communication with vent 14 and fuel tank 6 via a first tube 36 connected to vent line 8. Second chamber 18 is in fluid communication with vent 14 and fuel tank 6 via a second tube 38 connected to vent line 8. A pressure equalizing valve 40 is disposed in vent line 8 intermediate fluid communication between first and second tubes 32 and 38. Pressure equalizing valve 40 may be opened to equalize pressure between first and second chambers 16 and 18 when filling the same with fluid 22 via filler tube 28. It will be noted that equalizing valve 40 is normally closed during normal operation preventing fluid communication therethrough.

Figure 2:
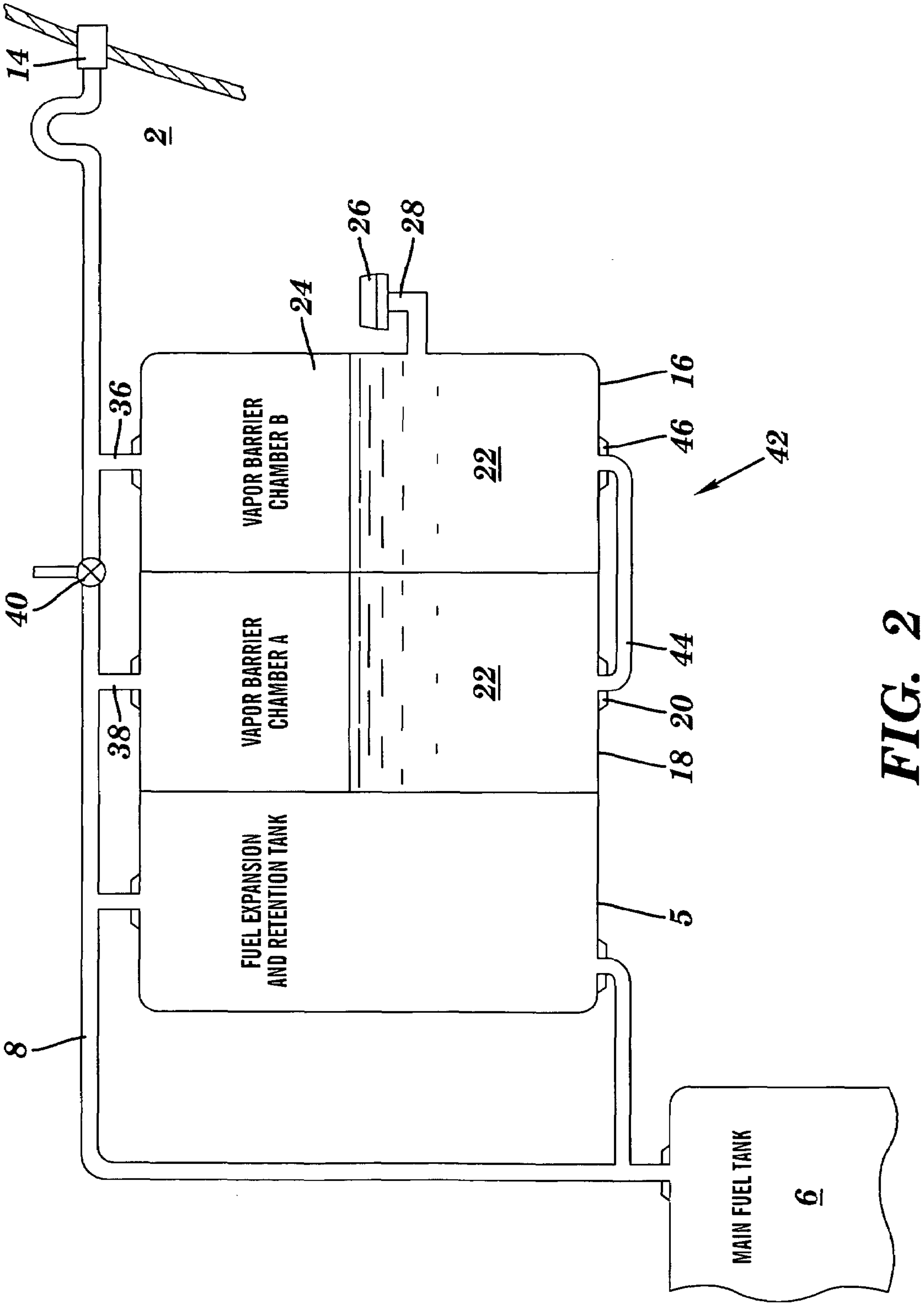
FIG. 2 is an enlarged diagrammatic view of a partial portion of the hull of FIG. 1 illustrating an alternative exemplary embodiment of a pressure compensation tank assembly.

FIG. 2 illustrates an alternative pressure compensation tank assembly 10 of FIG. 1 generally indicated at 42. In this embodiment, pressure compensation tank assembly 42 includes the first chamber 16 in fluid communication with the second chamber 18 disposed next to or in series with the first chamber 16. First chamber 16 is in fluid communication with second chamber 18 via one end of a crossover pipe 44 extending from the opening 20 disposed at the bottom surface defining the second chamber 18. An opposite end of crossover pipe 44 extends to an opening 46 disposed in a bottom surface defining the first chamber 16. First and second chambers are filled with a barrier fluid, such as oil 22, but not limited thereto, indicated below line 24.

Minimal internal pressure differences, changes, daily temperature swings, known as diurnal cycles cause fuel in rigid fuel tanks to expand and contract causing the release of hydrocarbons into the atmosphere. Continuous diurnal cycles cause daily fluctuations in fuel and fuel vapor volume. Without a way to compensate for this daily volume change, gasoline vapors (hydrocarbons) are emitted daily into the atmosphere. Air that is induced into the fuel tank mixes with the fuel creating more fuel vapor.

At 40% saturation in air, 520 gallons of hydrocarbon vapors equate to approximately 1 gallon or 3622 grams of liquid fuel. One gallon of fuel vapor contains approximately 6.97 grams of liquid fuel.

The EPA has expressed concern about the amount of hydrocarbons emitted into the atmosphere and have proposed limiting diurnal emissions to 1.1 grams/gal./day from the estimate of approximately 1.39 grams/gal./day, and estimate that would result in a 25% reduction of evaporative emissions from spark ignition marine vessels. One aspect of the present invention is to reduce diurnal emissions as well as stop loss due to diffusion of vapor out the vent line 8 by effectively sealing the vent line 8 with a the barrier fluid 22.

An internal fuel tank temperature rise from 20° C. to 30° C. will cause an increase in volume of approximately 2.2% if the pressure of tank 6 remains the same. A barrier oil 22 height differential of 12 inches between first and second chambers 16 and 18 results in approximately 0.37 pounds per square inch (PSI) pressure differential resulting in a volume increase of approximately 0.91%.

520 gallons of gasoline vapor at 40% saturation equate to approximately 1 gallon of gasoline, while 1 gallon of gasoline vapor=approximately 6.966 grams of gasoline.

A 100 gallon fuel tank ¾ full of fuel, heated from 26° C. to 38° C., and no tank pressure change, will emit approximately 2.3 Gal. of fuel vapor equating to approximately 16 grams of fuel.

Still referring to FIGS. 1 and 2, first chamber 16 and second chamber 18 installed in the tank vent system arrangement cause oil 22 to be pushed or drawn from one chamber 16, 18 to the other until all of the oil has moved to one from the other, at which point, in the case of decreasing volume of fuel tank 6, such as from cooling, air is drawn through the oil into the fuel tank 6 or as in the case of increasing volume, such as from heating, fuel vapor is expelled through the oil 22 into the atmosphere via vent 14.

Figure 3:
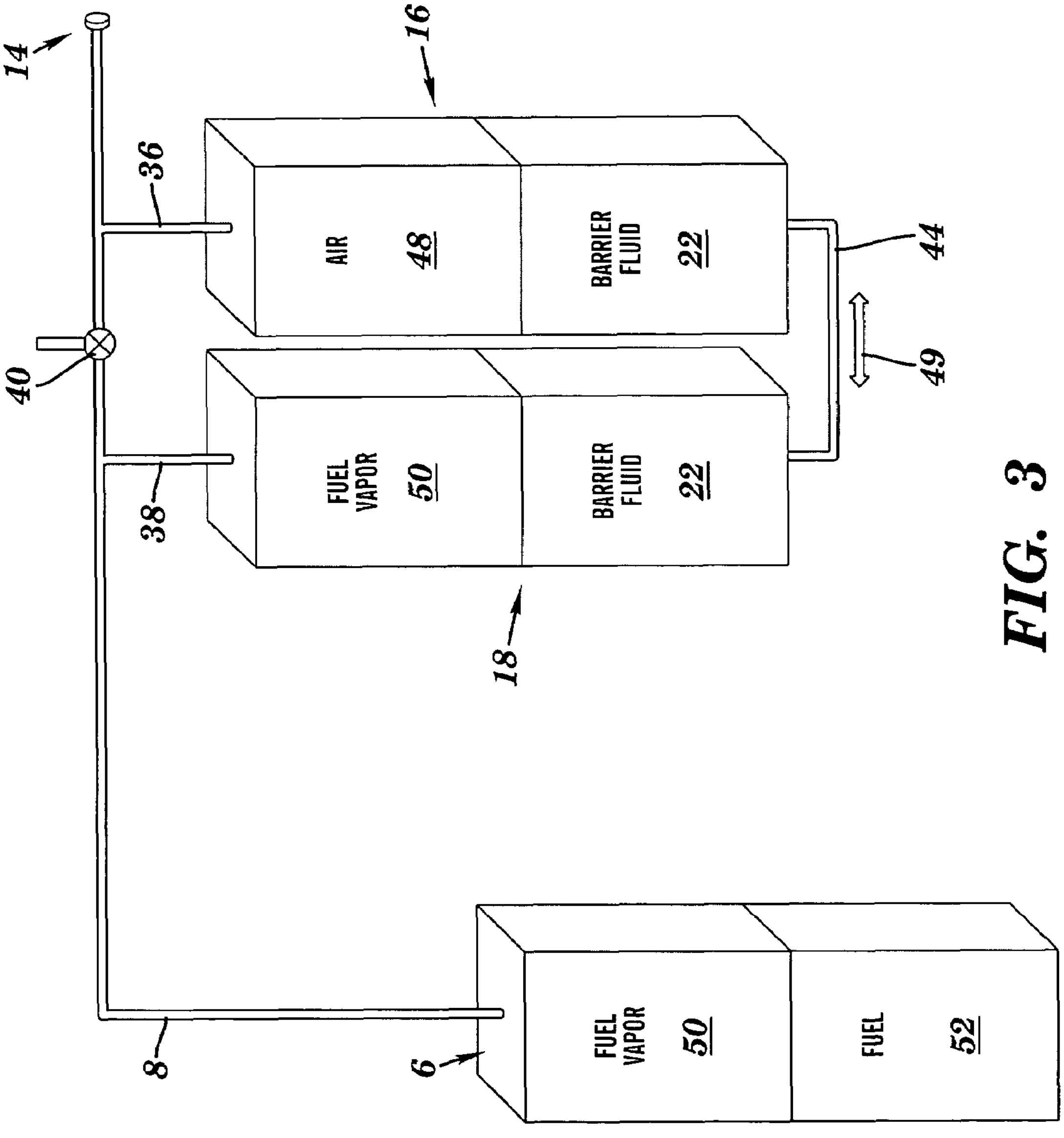
FIG. 3 is a schematic diagram of FIG. 2 illustrating a same level of barrier fluid in each chamber of the pressure compensation tank assembly when a pressure of the fuel tank 6 is equal to an ambient pressure of ambient air 48.

More specifically, with specific reference to FIG. 3, the embodiment of FIG. 2 is schematically illustrated. FIG. 3 illustrates that a level of barrier fluid 22 in first chamber 16 is at the same level of barrier fluid 22 in second chamber 18 when a pressure of the fuel tank 6 is equal to an ambient pressure of ambient air 48. Barrier fluid 22 is shown to move from one chamber to another via cross over pipe 44 in both directions 49. Barrier fluid 22 separates ambient air 48 and fuel vapor 50 above liquid fuel 52 in tank 6, thereby preventing mixing of ambient air and fuel vapor 50.

Figure 4:
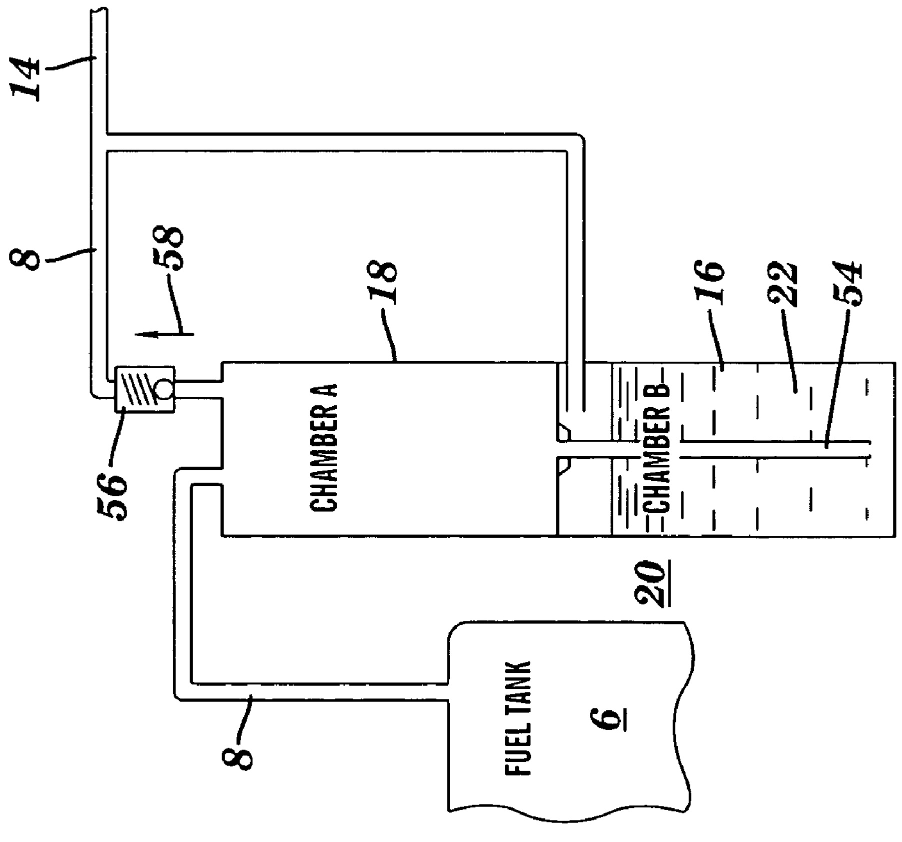
FIG. 4 is a schematic diagram illustrating a first chamber (vent side) located below a second chamber 18 (tank side) of a pressure compensation tank assembly in an alternative exemplary embodiment.

FIG. 4 illustrates an application where partial vacuum in the fuel tank 6 is acceptable but pressure is not, wherein first chamber 16 (vent side) is located below second chamber 18 (tank side). Second chamber 18 is in fluid communication with first chamber 16 via standpipe 54 extending from opening 20 of chamber 18 and into chamber 16. A pressure relief valve 56 is in fluid communication with second chamber 18 and vent 14 via vent line 8 preventing pressure build up while allowing a partial vacuum. The arrangement depicted in FIG. 4 is fitted with a one way pressure relief valve 56 to prevent positive pressure in the fuel tank 6 indicated with arrow 58, while still allowing displacement of barrier oil 22 with a decrease in volume, or lower pressure, in fuel tank 6. In such a case, it will be recognized by one skilled in the pertinent art that capacity of chambers 16 and 18 will have to be increased to compensate for increased volume.

Figure 5:
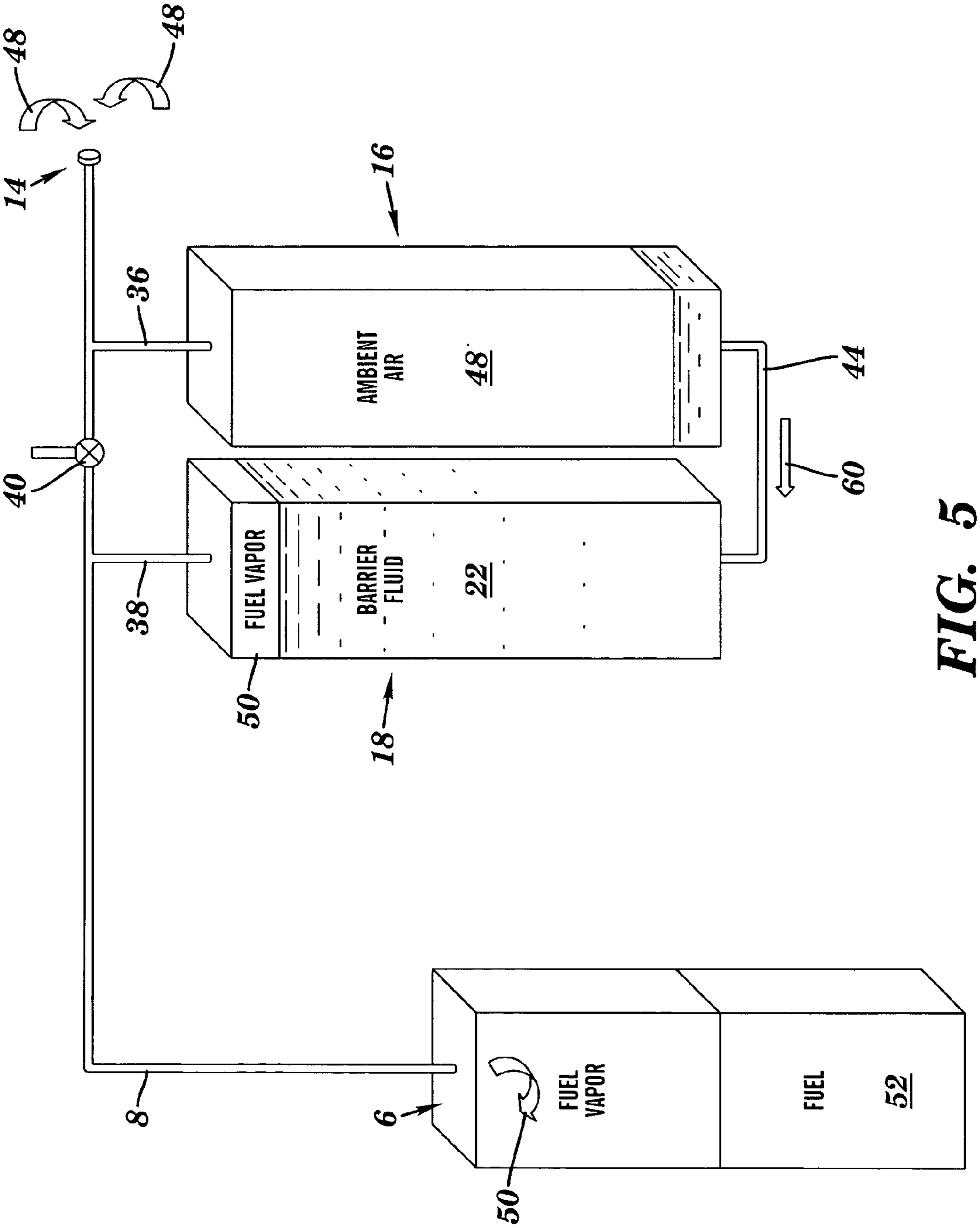
FIG. 5 is diagram of FIG. 3 illustrating a decreasing pressure of the fuel tank that has moved most of the barrier fluid from the first chamber (vent side) to the second chamber (tank side) via a cross over pipe.

FIG. 5 illustrates that a decreasing pressure of fuel tank 6 has moved most of the barrier fluid 22 from first chamber 16 to second chamber 18 via cross over pipe 44 in a direction indicated by arrow 60. Such a decreased pressure differential is due to normal diurnal cooling. In this manner ambient air 48 is prevented from entering fuel tank 6 and only fuel vapor 50 disposed at a top portion of second chamber 18 is forced back into fuel tank 6 by movement of barrier fluid in direction 60.

If the barrier fluid 22 is only allowed to rise 12 inches before either ambient air 48 or fuel vapor 50 can pass through cross over pipe 44, for example, a pressure differential between the fuel tank 6 and ambient air 48 would not exceed 0.5 PSI. In one embodiment, for example, each chamber 16 and 18 is configured as a rectangular chamber as indicated in FIGS. 3 and 5 having dimensions of 12×6×6 inches. The two chambers 16 and 18 will prevent hydrocarbon emissions from a half full 100 gallon fuel tank 6 that is subjected to a 10° C. (18° F.) diurnal cycle temperature swing. It will be noted, however, that a 20° C. temperature swing is also contemplated with the chambers 16, 18 and tank 6 having the same dimensions.

Figure 6:
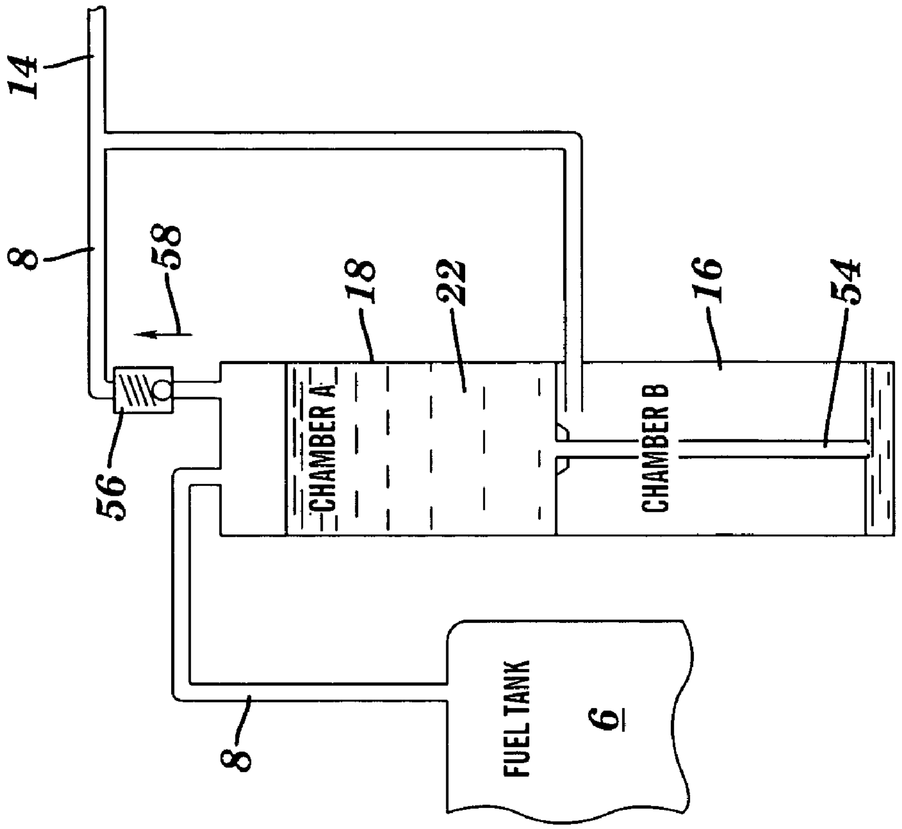
FIG. 6 is a schematic diagram of the application as in FIG. 4 where the first chamber (vent side) is located below the second chamber (tank side) and illustrates movement of barrier fluid flow when there is a decreased volume (or pressure) of the fuel tank.

FIG. 6 is an application as in FIG. 4 where partial vacuum in the fuel tank 6 is acceptable but pressure is not, and wherein first chamber 16 (vent side) is located below second chamber 18 (tank side). This arrangement, like FIG. 5, illustrates a result of barrier fluid 22 flow when there is a decreased volume (or pressure) of fuel tank 6. Barrier fluid 22 is shown to be drawn into second chamber 18 without allowing air 48 to enter the fuel tank 6. One way pressure relief valve 56 prevents positive pressure in the fuel tank 6, while still allowing displacement of barrier fluid 22 with such a decrease in volume (or pressure) in fuel tank 6.

Figure 7:
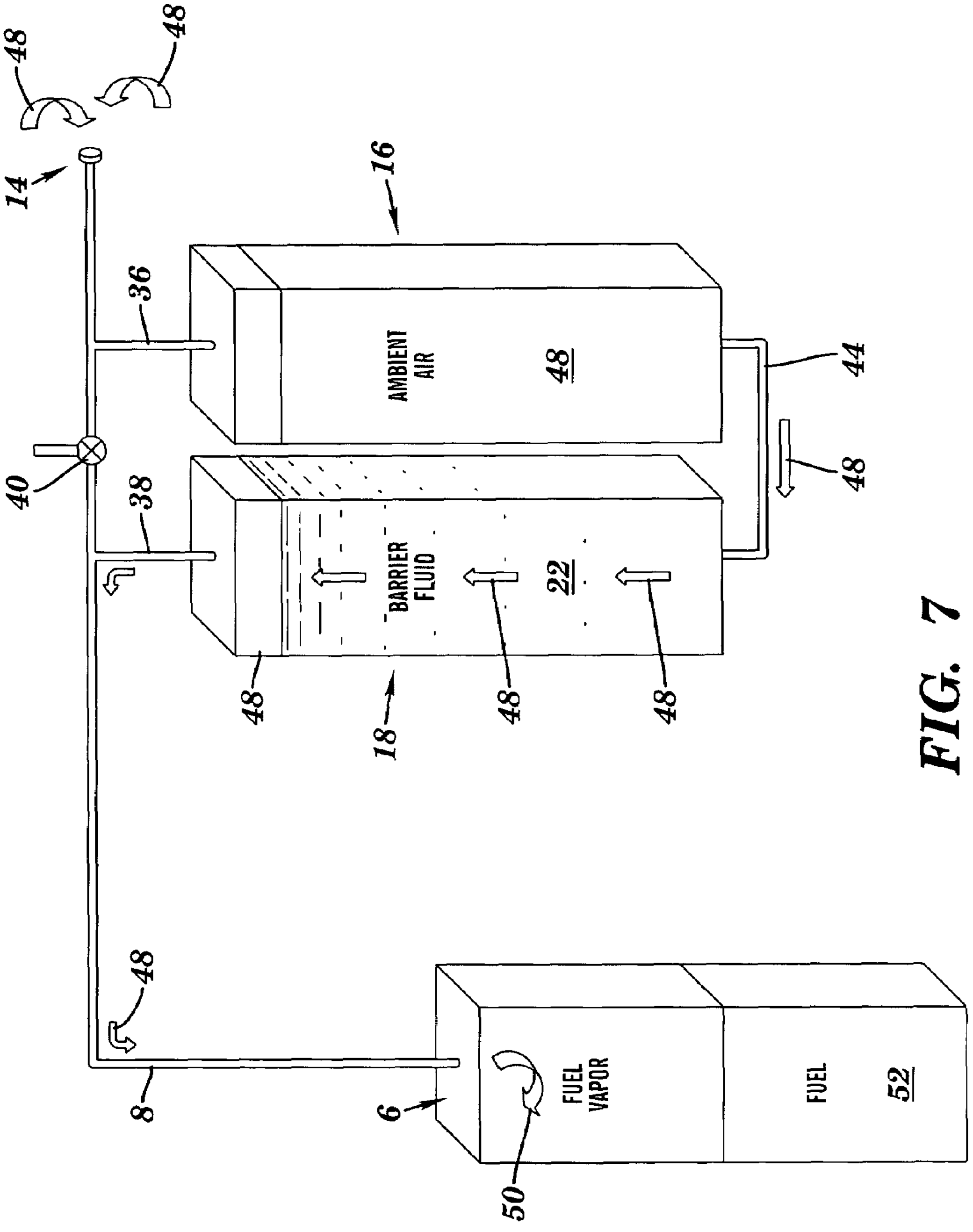
FIG. 7 is a schematic diagram of FIG. 5 illustrating further decreasing pressure of the fuel tank that has moved all of the barrier fluid from the first chamber (vent side) to the second chamber (tank side) via the cross over pipe, thus allowing ambient air into the fuel tank.

FIG. 7 illustrates a situation when decreasing fuel tank volume (or pressure) causes all of the barrier fluid from first chamber 16 to second chamber 18, or at least empty into a horizontal potion of crossover pipe 44. At this point air 48 is drawn through the barrier fluid 22 disposed in second chamber 18 and into fuel tank 6. As discussed above, if the barrier fluid in second chamber 18 is only allowed to rise twelve inches in chamber 18, for example, the pressure differential between the fuel tank 6 and ambient air 48 would not exceed 0.5 PSI.

Figure 8:
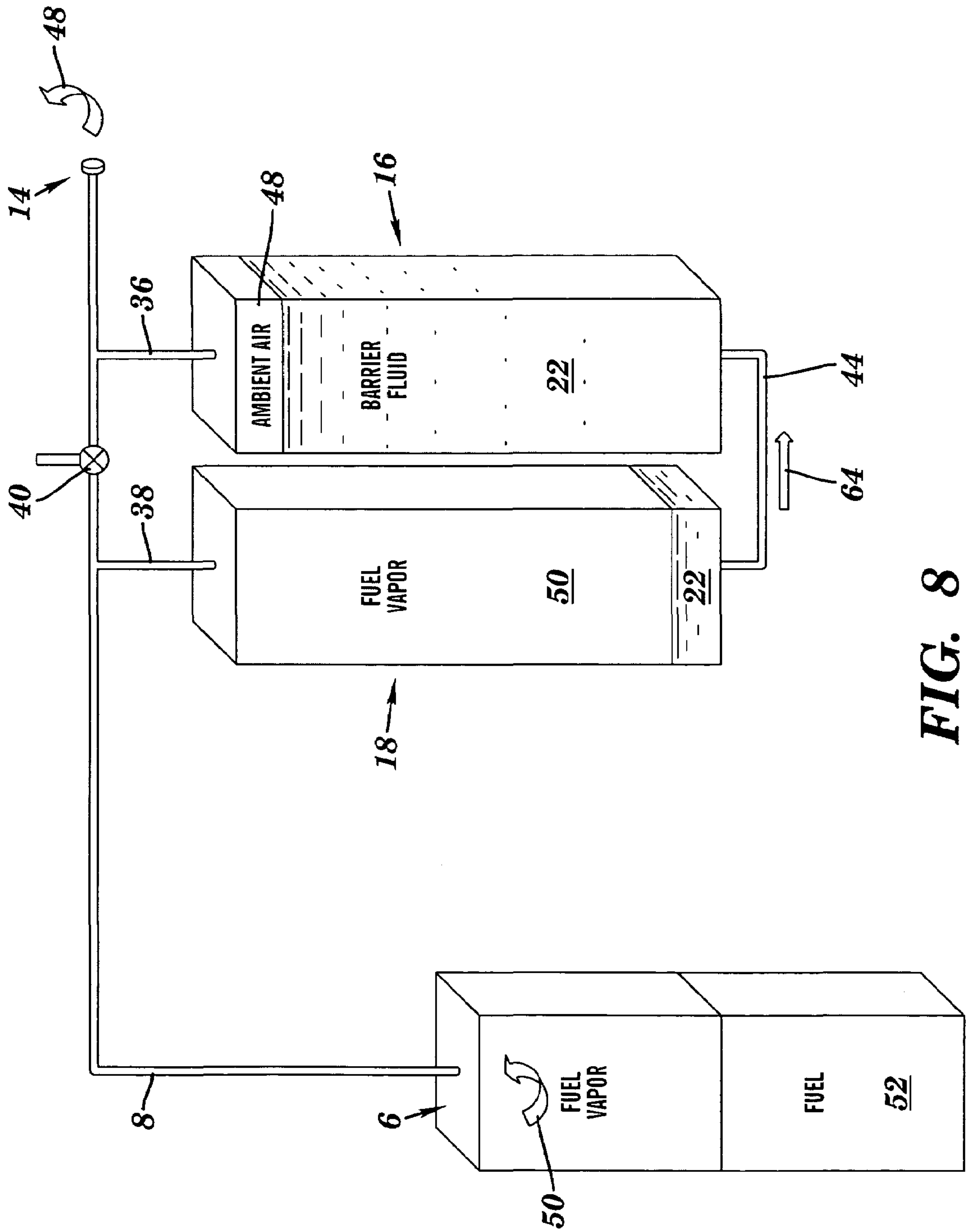
FIG. 8 is a schematic diagram of FIG. 3 illustrating a situation when increasing fuel tank pressure (or volume) has moved most of the barrier fluid from the second chamber to the first chamber during normal diurnal heating, for example.

FIG. 8 illustrates a situation when increasing fuel tank pressure (or volume) has moved most of the barrier fluid 22 from second chamber 18 to first chamber 16 during normal diurnal heating, for example. As pressure or (or volume) of fuel vapor 50 increases, barrier fluid moves through cross over pipe 44 in a direction indicated with arrow 64.

Figure 9:
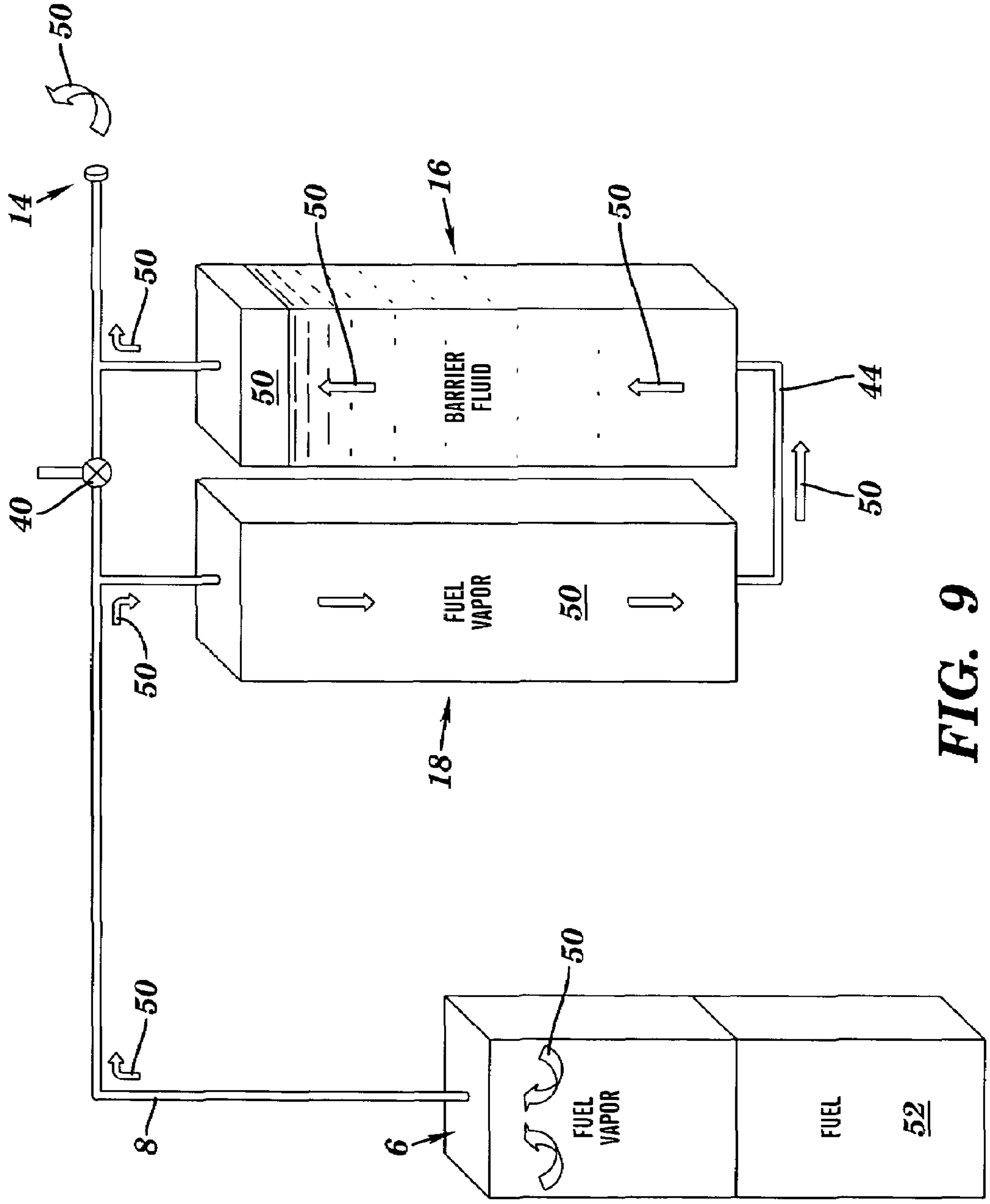
FIG. 9 is a schematic diagram illustrating that the increasing fuel tank pressure (or volume of fuel vapor) depicted in FIG. 8 has reached a point where all of the barrier fluid from the second chamber has moved to the first chamber, or at least empty into a horizontal portion of the crossover pipe 44, thus allowing fuel vapor to be drawn through the barrier fluid in the first chamber and out to the ambient.

FIG. 9 illustrates that the increasing fuel tank pressure (or volume of fuel vapor 50) depicted in FIG. 8 has reached a point where all of the barrier fluid 22 from second chamber 18 has moved to first chamber 16, or at least empty into a horizontal portion of crossover pipe 44. At this point fuel vapor 50 is drawn through the barrier fluid 22 disposed in first chamber 16 and out vent 14. Again, as discussed above, if the barrier fluid in first chamber 16 is only allowed to rise twelve inches in chamber 18, for example, the pressure differential between the fuel tank 6 and ambient air 48 would not exceed 0.5 PSI.

It will be recognized with respect to FIGS. 7 and 9 that once all of the barrier fluid 22 is displaced from either chamber into the other, air is allowed to enter or fuel vapor is allowed to escape from assembly 10. In this manner, this process naturally allow pressure relief at maximum and minimum pressures automatically without the use of a mechanical pressure relief valve. Furthermore, it will be recognized by one skilled in the pertinent at that displacement of the barrier fluid from one chamber to the other is a result of a pressure differential between the fuel tank and the ambient air. The maximum pressure differentials, both positive and negative, can be set by vertical position of the chambers relative to one another including the addition of a one way pressure relief valve. Lastly, it will be noted that compensation volume of barrier fluid may be controlled by a volume of barrier fluid that may move between the chambers.

Figure 10:
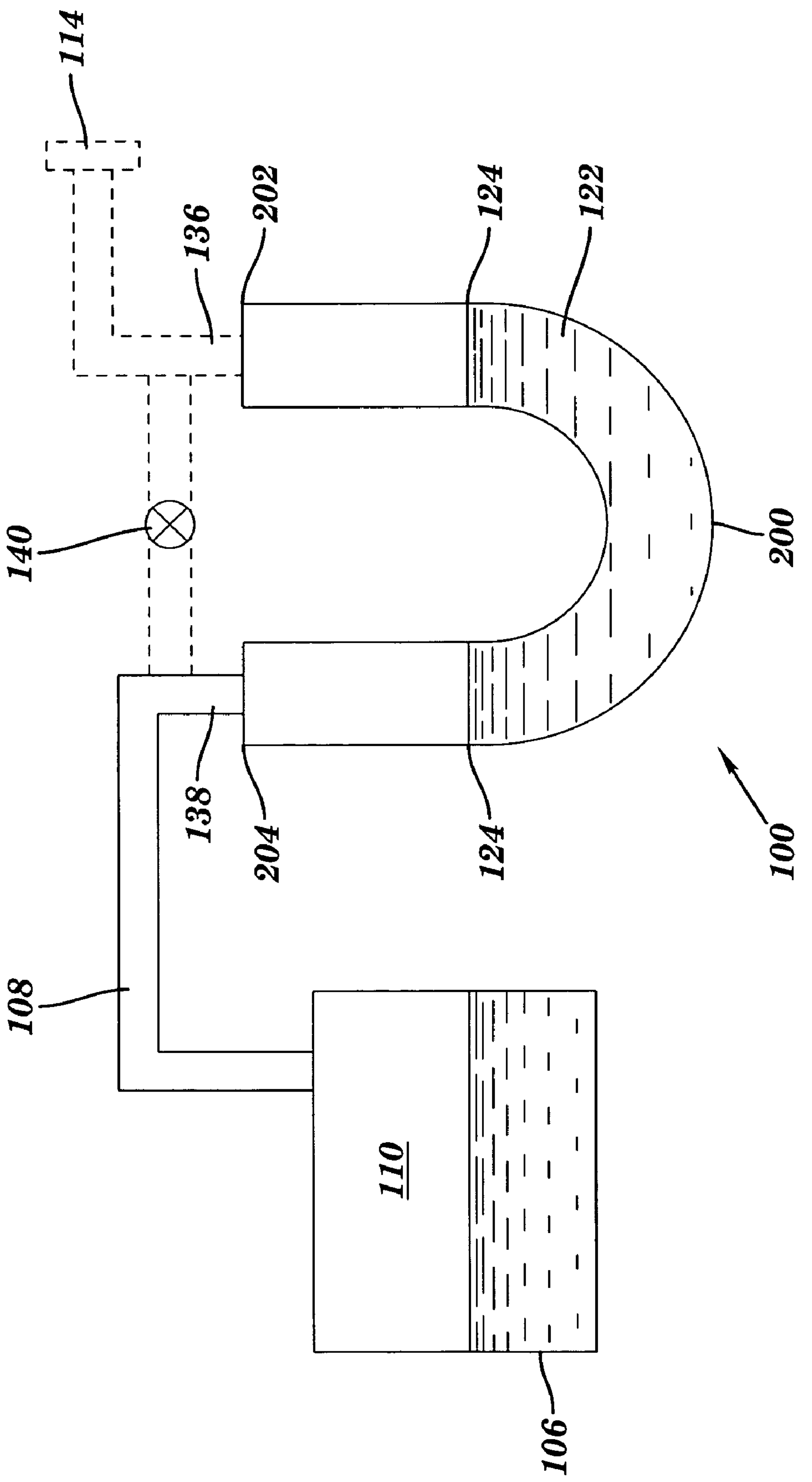
FIG. 10 is a schematic diagram of a pressure compensation tank assembly having a barrier fluid containing chamber where the chamber is defined by a first end in fluid communication with a first fluid and a second end in fluid communication with the atmosphere in accordance with an exemplary embodiment.

FIG. 10 illustrates a pressure compensation tank assembly 100 in fluid communication with a fluid repository 106 having a first fluid 110 disposed therein. Assembly 100 is configured to limit emission of first fluid 110 into the atmosphere. More specifically, assembly 100 includes a chamber 200 defined by a first chamber 116 in fluid communication with the atmosphere via at a first end 202 defining one end of chamber 200 and a second chamber 118 in fluid communication with first fluid 110 in fluid repository 106 at a second end 204 defining an opposite end of chamber 200 via a vent line 108. In an exemplary embodiment and still referring to FIG. 10, vent line 108 extending from fluid repository includes a vent line 138 in fluid communication with the second chamber 118 above a barrier fluid level 124 therein. Vent line 108 is in further fluid communication with the first chamber 116 above a barrier fluid level 124 therein via a vent line 136 extending to first end 202 having a pressure relief valve 140 therebetween. Vent line 136 is in further communication with a vent 114 exposed to the atmosphere. Pressure relief valve 140, vent line 136, an vent 114 are shown with phantom lines to illustrate that they may be eliminated, while maintaining a primary function of assembly 100. It will be recognized that below each barrier fluid level 124 in each chamber 116 and 118 is a barrier fluid 122 that limits emission of first fluid 110 from fluid repository 106 out to the atmosphere due to expansion of the first fluid 110.

Barrier fluid 22 and 122 as used in the exemplary embodiments described above referred to by the applicant as "barrier oil" can be any of many readily available fluids.

Such fluids include, but are not limited to, fluids already stored in tanks that are part of the internal combustion engine, vehicle or vessel system that may be suitable for use as "barrier oil" in the invention. It is envisioned that any liquid with a low vapor pressure will work, but some are less troublesome and more cost effective than others. The following are examples, but are not limited to, which may be suitable, as well as cost effective, including engine injection oil, as described with reference to the embodiment depicted and described in FIG. 1. Engine cooling system fluid is also contemplated. Most cooling systems on modern engines utilize a 'closed' cooling system, which uses a separate tank containing engine coolant. When the cooling system heats up the excess coolant is stored in the coolant reservoir tank so that it can be returned to the system when the cooling system cools. As in the drawing of the invention which is using injection oil, engine coolant in place of the "barrier oil" can be drawn or returned to the bottom cross pipe as can the following). Further, hydraulic fluid is contemplated, thus eliminating a need for a hydraulic fluid reservoir. Lastly, engine crankcase oil and transmission oil are also contemplated for use for the barrier fluid.

The amount of volume increase caused by a temperature increase in the fuel tank is reduced by allowing a partial pressure to build when displacing the barrier fluid, e.g., oil. Displacing the barrier oil to a height of twelve inches causes a pressure increase of 0.37 PSI (varying slightly with the specific gravity of the "barrier oil") reducing the amount of volume increase with no pressure change, by more than half. It will be noted that 0.37 PSI was determined by using an estimated specific gravity for a light grade oil such as engine oil, which is lighter than water.

For example, given a 100 gallon fuel tank filled three-quarters full with gasoline, if internal fuel tank pressure is allowed to vary from ambient by about 0.37 PSI positive and 0.37 PSI negative (i.e., +/−0.37 PSI) with a fuel temperature variance from about 28° C. to about 38° C. and about 28° C. to about 18° C. The difference in volume of the fuel and vapor from about 18° C. to about 38° C. is approximately 1.8 gallons compared to approximately 3.3 gallons difference in volume with no pressure change.

Information About Tank Emissions

A pair of cylindrical barrier tanks each having dimensions of twelve inches high and a six inch diameter (cylindrical tanks) each hold 1.47 gallons. When each barrier tank is ½ full with barrier fluid, each barrier tank thus allows a 1.47 gallon volume swing. Rectangular barrier tanks dimensioned with a twelve inch height and a six inch square base hold 1.87 gallons each, while barrier tanks twelve inches high having a four inch square base hold 0.83 gallons each.

A height of the barrier tank controls and limits a maximum pressure differential between the fuel tank it is fluidly communicated with and the ambient. A specific gravity of the barrier fluid used also effects the maximum pressure differential.

For example, when water is used as a barrier fluid, the specific gravity of water is one (1.0). A tank having a twelve inch height would limit pressure differential to about 0.434 PSI. A tank having a 27.7 inch tank height would limit pressure differential to about 1.0 PSI.

It is well recognized by one skilled in the pertinent art that changes in temperature causes corresponding changes in pressure and volume under the ideal gas equation, PV=nRT. For example, in 10° C. diurnal cycle temperature increase of 20° C. (68° F.) to 30° C. (86° F.), volume change within a half filled 100 gallon tank is inversely proportional to a pressure of the tank. In Example A, with no pressure change, there is a 2.18 gallon increase in volume. In Example B, with a 0.20 PSI increase, thee is a 1.48 gallon increase in volume. In Example C, with a 0.40 PSI increase, there is a 0.811 gallon increase in volume. Therefore, it can be seen that the volume increase decreases with increasing pressure.

In Example A, 2.18 gallons of hydrocarbons (e.g., fuel vapor) would escape into the atmosphere with such a 10° diurnal cycle. In addition, when the tank cools to the original temperature, fresh unsaturated air is drawn into the tank causing additional vapor emissions as that air becomes saturated with fuel and expands.

As seen above in the exemplary embodiments of the invention, we can control emissions in a 20° C. diurnal cycle on a 100 gallon ½full tank with two rectangular barrier tanks (e.g., 12 inch height×6 inch base) half full of barrier fluid. If a third tank is added, the barrier tanks can be protected from contamination with fuel. In example, if the 100 gallon fuel tank is filled to the top and then warms up to a 20° C. differential, expansion of the fuel will cause an increase of about 1.9 gallons). Other arrangements to prevent contamination of the barrier tanks are envisioned including using a float valve and pressure relief valve. However, in any case, lack of a containment tank will result in excess fuel being lost.

As discussed above, an internal fuel tank positive pressure differential can be limited to zero while still allowing internal negative differentials, or conversely, internal fuel tank negative pressure differential can be limited to zero while allowing internal positive pressure differentials by locating the barrier tanks at different heights in relation to each other and with the use of pressure valves.

In the Example A above, a 10° C. diurnal cycle results in 2.18 gallons of vapor being expelled, which equates to 15.22 grams of fuel, given one gallon of liquid equals about 520 gallons of vapor. This figure is appears to be negligible until it is associated with the millions of boats and 365 days of a year in which these boats are operated. For example, assuming 5,000,000 inboard tanks each having a 50 gallon average capacity, a 10° C. diurnal cycle results in emissions of about 10,482 gallons of fuel/day, which equates to about 3,825,964 gallons/year.

The EPA estimates that in the year 2000, diurnal evaporative losses from non-road S/I (spark ignition) fuel tanks were about 22,700 tons of hydrocarbons and about 67,760,000 gallons.

Another consideration for such evaporative losses includes a loss from diffusion of vapor out of the fuel tank vents. EPA tests estimate that this amount to be about 0.07 to about 0.24 grams/gallon/day, given 4.5 feet of ⅝" vent line and an ambient temperature of about 22° C. to about 36° C. Therefore, with an average of about 0.15 grams/gallon/day results in 5,000,000 boats each having a 30 gallon tank emitting about 2,700,000 gallons per year.

Although the above described embodiments have been described with reference to a fuel tank for a marine vessel configured to limit emission of a fuel vapor therefrom into the atmosphere, it will be noted that the above disclosure is intended for use with a fluid in any tank where flow of the fluid from the tank into the atmosphere may be limited using a barrier fluid chamber as disclosed. In any case, the above exemplary embodiments disclose a method and apparatus that allows for some expansion and contraction of a fluid in a tank without inducing ambient air into the tank or fluid into the atmosphere. Furthermore, the above described exemplary embodiments disclose a method and apparatus to reduce diurnal emissions.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A tank pressure compensation system comprising:

a chamber having a first end and a second end, said first end connectable to a fluid repository having a first fluid for fluid communication with said first end, said second end in fluid communication with the atmosphere, said chamber receptive to a second fluid contained in a portion of said chamber intermediate said first and second ends disposed above a level of said second fluid, wherein said chamber allows displacement of said second fluid away from said first end toward said second end of said chamber when said first fluid expands while preventing flow of said first fluid into the atmosphere; and a pressure equalizing valve disposed in a vent line in fluid communication with said first and second ends.

2. The system of claim 1, wherein said first fluid includes fuel vapor.

3. The system of claim 1, wherein said second fluid is a barrier fluid having a low vapor pressure.

4. The system of claim 1, wherein said chamber is configured as one of a U, V, and W having opposing elevated ends as said first and second ends of said chamber.

5. The system of claims 1, wherein said chamber includes a first chamber and a second chamber, said first chamber having a first lower portion and a first upper portion, said first upper portion in fluid communication with said first fluid via said first end, said second chamber having a second lower portion and a second upper portion, said second upper portion in fluid communication with the atmosphere via said second end, said second lower portion in fluid communication with said first lower portion of said first chamber.

6. The system of claim 5, wherein said first and second chambers are in fluid communication via a tube extending from said first lower portion to said second lower portion, respectively.

7. The system of claim 5, wherein said first chamber is disposed within said second chamber, said first chamber having an opening in a bottom surface thereof providing fluid communication with a second lower portion of said second chamber.

8. The system of claim 1, wherein said fluid repository is a fuel tank for an internal combustion engine.

9. The system of claim 8, wherein said fuel tank includes a fuel tank for a marine vessel.

10. The system of claim 9, wherein said fuel tank is connectable to said first end via a fuel vent line, said second end is connectable to a vent via a vent line, said vent line and fuel vent line in fluid communication via a pressure relief valve therebetween.

11. The system of claim 10, wherein said fuel tank is adapted to contain at least one of gasoline and diesel fuel.

12. The system of claim 11, further comprising a fuel expansion tank connected in parallel to said fuel vent line having one end connected to said fuel tank and another end connected to said first chamber.

13. A marine vessel fuel tank pressure compensation assembly for use in the hull of a marine vessel that has a fuel system including a fuel tank vented to a vent that communicates with the atmosphere, the system comprising:

- a first chamber having a first lower portion and a first upper portion, said first upper portion configured for fluid conununication with a first fluid disposed in the fuel tank via a fuel vent line;
- a second chamber having a second lower portion and a second upper portion, said second upper portion configured for fluid communication with the vent via a vent line, said second lower portion in fluid communication with said first lower portion of said first chamber;
- a barrier fluid disposed in at least a portion of said first chamber, said barrier fluid configured to allow displacement of said barrier fluid from said first chamber into said chamber when said first fluid expands while preventing flow of said first fluid into the atmosphere; and
- a pressure equalizing valve, disposed in said vent line, said pressure equalizing valve in fluid communication between said first and second upper portions.

14. The assembly of claim 13, wherein said first and second chambers are in fluid communication via a tube extending from said first lower portion to said second lower portion, respectively.

15. The assembly of claim 13, wherein said first chamber is disposed within said second chamber, said first chamber having an opening in a bottom surface thereof providing fluid communication with a second lower portion of said second chamber.

16. The assembly of claim 13, wherein the fuel tank is adapted to contain at least one of gasoline and diesel fuel.

17. The assembly of claim 16, further comprising a fuel expansion tank connected in parallel to the fuel vent line having one end connectable to the fuel tank and another end connectable to said first chamber.

18. The assembly of claim 13, wherein said first fluid includes fuel vapor.

19. The assembly of claim 13, wherein said barrier fluid is a barrier fluid having a low vapor pressure.

20. A method of reducing fuel vapor emitted from a vent line utilizing a pressure compensation assembly in the hull of a marine vessel that has a fuel system including a fuel tank connected to a vent via the vent line that communicates with the atmosphere, wherein the vent line includes a first vent line fitting and a second vent line fitting both adapted for direct parallel communication with the pressure compensation assembly, the method comprising:

attaching the pressure compensation assembly to the marine vessel, wherein the pressure compensation assembly includes;

- a first chamber having a first lower portion and a first upper portion, said first upper portion configured for fluid communication with a first fluid disposed in the fuel tank via a fuel vent line;
- a second chamber having a second lower portion and a second upper portion, said second upper portion configured for fluid communication with the vent via a vent line, said second lower portion in fluid communication with said first lower portion of said first chamber;
- a barrier fluid disposed in at least a portion of said first chamber, said barrier fluid configured to allow displacement of said barrier fluid from said first chamber into said chamber when said first fluid expands while preventing flow of said first fluid into the atmosphere; and
- a pressure equalizing valve, disposed in said vent line, said pressure equalizing valve in fluid communication between said first and second upper portions.

* * * * *